United States Patent [19]
Fisher

[11] 3,751,585
[45] Aug. 7, 1973

[54] COUNTING SYSTEMS IN IMAGE ANALYSIS EMPLOYING LINE SCANNING TECHNIQUES

[76] Inventor: Colin Fisher, Meldreth House Meldreth, Royston Hertfordshire, Boyston, England

[22] Filed: July 12, 1971

[21] Appl. No.: 161,844

Related U.S. Application Data

[63] Continuation-in-part of Ser. No. 821,180, April 29, 1969, Pat. No. 3,619,494.

[52] U.S. Cl. ............... 178/6.8, 178/6, 178/DIG. 36, 178/DIG. 37

[51] Int. Cl. ............................................. H04n 7/02

[58] Field of Search ........................ 178/6.8, DIG. 3, 178/DIG. 36, DIG. 37

[56] References Cited

UNITED STATES PATENTS

| | | | |
|---|---|---|---|
| 3,578,904 | 5/1971 | Dewey et al. | 178/DIG. 36 |
| 3,632,865 | 1/1972 | Haskell et al. | 178/DIG. 3 |
| 3,579,249 | 5/1971 | Dewey et al. | 178/DIG. 36 |
| 3,244,810 | 4/1966 | Williams | 178/DIG. 36 |
| 2,891,722 | 6/1959 | Nuttall et al. | 178/DIG. 36 |

*Primary Examiner*—Howard W. Britton
*Attorney*—Beveridge & DeGrandi

[57] ABSTRACT

The invention provides for the use of so-called shift registers in feature counting and measuring image analysis apparatus.

2 Claims, 1 Drawing Figure

PATENTED AUG 7 1973 3,751,585
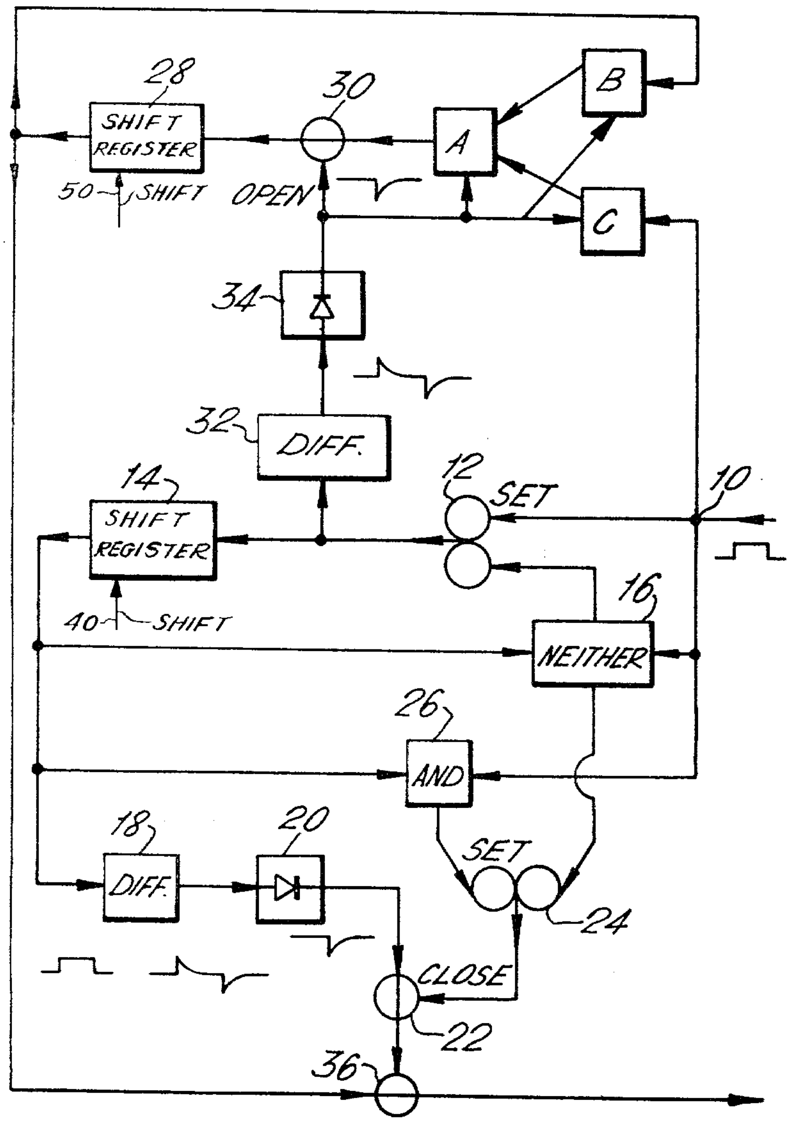

COUNTING SYSTEMS IN IMAGE ANALYSIS EMPLOYING LINE SCANNING TECHNIQUES

This application is a continuation-in-part of United States patent application No. 821,180 filed 4-29-69 now U.S. Pat. No. 3,619,494.

This invention concerns apparatus employing line scanning for counting features in a field by analysis of a video signal obtained by scanning an image of the field, and also an arrangement by which the features may be counted thereby in time coincidence with information relating to the feature.

By definition a feature in a field is an area of the field having a sufficiently different optical characteristic from its immediate surroundings, as to be distinguishable (by illuminating the field either by incident or transmitted light) from its immediate surroundings due to it being for example, lighter or darker, or a different colour.

In general an image of the field containing the features is scanned by an inspection spot in a series of lines. The resulting variations in optical intensity in the image, due to the features, are converted to an electronic signal exactly comparable to a television video wave form, the amplitude of the video signal varying in sympathy with the variations in optical intensity. To this end a television camera is employed and where microscopic specimens are concerned, this is coupled to a light microscope.

The amplitude of the video signal output of a television camera varies from a first level to a second level as the scanning spot crosses the boundary defining a feature in the field. Assuming that the optical intensity within the feature is substantially constant, the video signal amplitude will remain at or near the second level until the spot leaves the feature when it will revert to the first level again (corresponding to the optical intensity surrounding the feature). Since the path of the scanning spot across the feature is a straight line this can be thought of as a "chord" of the feature and with constant scanning speed, the duration of the amplitude change due to the feature is a measure of of the length of the chord. Thus, the phrase "line scan intersection with a feature" means the chord defined by the path of the scanning spot across the feature in the image. Amplitude changes due to features can be detected by threshold detection and the electrical pulses so obtained or signals denoting the beginning and ending of such pulses will be referred to as intersect pulses.

In order to generate a count pulse for a detected feature it is necessary to delay the intersect pulses from one line scan to the next to determine e.g. when a pulse occurs on one line which is not followed by a coincident pulse on the next line. Since a signal comprising intersect pulses can only have two states (i.e. it is a so-called binary signal) I have discovered that a simple device for delaying the intersect pulses from one line scan period to the next comprises a large number of bistable devices connected in series to form a so-called shift register. The intersect pulse information is shifted through the register by shift pulses having a repetition frequency equal to the number of devices divided by the time to scan one line.

It is often necessary to be able to characterise the separate features in a field by a parameter measurement such as for example their area, length, shape etc. Apparatus which may be employed for such a purpose is described in my earlier application Ser. No. 820,180 of which the present is a continuation-in-part application. In this apparatus information relating to the parameter of interest is computed during scanning of a feature and the information is re-circulated from line to line until an anti-coincidence pulse is released at the end of scanning the feature, this pulse serving to release the accumulated information about the feature parameter. Where, as is usually the case, the parameter information can be expressed as a two-state (i.e. binary) signal, I have also discovered that it is very convenient and advantageous to employ a shift register for re-circulating the two state parameter signal from line to line.

The use of shift registers in place of conventional delay lines simplifies the synchronizing of the various delays required in an image analysis apparatus.

The invention will now be described by way of example with reference to the accompanying drawing, which is a block circuit diagram of part of an image analysis system incorporating an anti-coincidence pulse generator and parameter computer to which the invention may be applied with advantage.

In the drawing intersect pulses obtained by scanning a field containing features and threshold detecting the resulting video signal, are applied to the junction 10. Each pulse serves as a set-signal for a bistable device 12 to produce a so-called "modified video pulse" V'. The modified video pulses which are also two state signals like the intersect pulses are applied to a coincidence delay device 14 which introduces a time delay equivalent to the line scan period T. In accordance with the invention the delay device 14 comprises a series of bistable devices connected to form a so-called shift register which is shifted by pulses at input 40. The intersect pulses are also applied to one side of a Neither-gate 16 and the delayed modified video pulses V' from the delay device 14 are applied to the other side of the Neither-gate 16, the arrangement being such that when no pulse is present in either signal a reset signal passes from the Neither-gate 16 to reset the bistable device 12. A modified video pulse V' thus starts when an intersect pulse is first received at junction 10 and stops at the end of the pulse or at the end of a coincident pulse from the previous line whichever is the later.

The bottom right-hand corner of each feature is detected by an anti-coincidence circuit (shown in the lower part of FIG. 1), which comprises a differentiating circuit 18 and a rectifying circuit 20 which serve to produce a pulse corresponding to the end of each modified video pulse in each line. The pulse from the rectifying circuit 20 is fed through a gate 22 which is controlled by a bistable device 24 which operates to close the gate 22 if there has been coincidence, that is, an intersect pulse from the current scan line and a modified video pulse from the previous scan line have coincided. The bistable device 24 is set by an output from an AND-gate 26 and reset by an output from the Neither-gate 16. AND-gate 26 has two inputs to which are applied delayed modified video pulses from the coincidence delay 14 and current intersect pulses from the junction 10. Thus the bistable is only reset (thereby opening the gate 22) immediately after the end of a modified video pulse V' where there is no intersect pulse on the current scan line corresponding to that feature. In this way an end of feature pulse will only pass through the gate 22 at the "bottom right-hand corner" of the modified feature shape. For convenience this pulse is referred to as an "anti-coincidence pulse," or ACP.

The remainder of the circuit in FIG. 1 constitutes a computer for computing from the intersect pulses or some other synchronous signal, the value of a parameter of each detected feature and keeping the value in association with the particular feature concerned. Such a computer is referred to as an associated parameter computer and is exemplified in FIG. 1 by a first module C to which the current intersect pulses from junction 10 are supplied. Module C produces the particular parameter of interest in synchronism with each current intersect pulse, such as for example, its presence, its length, its position in the scan, the value of some other related signal etc. A second module B receives and holds the signal from an associated parameter delay device 28, which corresponds to the value of the parameter computed up to and including the previous scan line. In accordance with the invention, the delay device 28 also comprises a shift register which may be shifted by pulses at input 50. The third module A accepts both these values and computes a fresh value to include the information from the current scan line. This new value is held in the module A ready for application to the delay device 28. The input for a differentiating circuit 32 is derived from each modified video pulse V' and the differentiated signal is supplied to a rectifying circuit 34. The differentiating and rectifying circuits 32, 34 thereby produce one pulse at the end of each modified video pulse V'. This pulse serves to open the gate 30 at a time corresponding to the end of each modified video pulse so that the output from the module A is at that time supplied immediately to the associated parameter delay device 28.

The output from the rectifying circuit 34 is also arranged to reset the modules A, B and C and the associated parameter signal stored in the delay device 28 is released at the end of the feature, by opening a gate 36.

Various functions may be performed by choice of modules A, B and C. For example, by arranging that module C registers the length of the chord in the current line scan and module A adds the output from B and C the associated parameter becomes the area of the feature. Similarly the height, the width or the perimeter of a feature may be determined.

If data handling capacity is limited, a useful arrangement for sizing can be obtained by arranging that module C only responds when a chord in the direction of line scan in the current scan line is longer than a predetermined length. Modules A and B then merely recirculate this fact and only one "bit" of information is required, the associated parameter recording whether or not the feature contains a chord in the line scan direction longer than the predetermined value. In this way features can be size discriminated on the basis of the longest chord in the line scan direction with no risk of re-entrant features being mis-counted.

I claim:

1. Apparatus employing line scanning for counting individual features in which a two state signal derived from the video signal from each line scan is delayed by delay means and compared with a two state signal derived from the video signal from the next line scan for controlling the generation of a count pulse for each feature, the improvement wherein; said signal delay means for delaying the two state signal from line to line comprises a shift register.

2. Apparatus as set forth in claim 1 further comprising computer means for generating a binary type electrical information signal whose value is representative of a parameter of a feature during scanning thereof, memory means comprising a shift register for retaining the information signal from line to line and gating means operable on release of said count pulse for the feature to release the information signals stored in the memory means relating thereto.

* * * * *

UNITED STATES PATENT OFFICE
CERTIFICATE OF CORRECTION

Patent No. 3,751,585 Dated August 7, 1973

Inventor(s) Colin Fisher

It is certified that error appears in the above-identified patent and that said Letters Patent are hereby corrected as shown below:

Page 1, between lines 8 and 9 add a new group of lines which states

"Priority: May 1, 1968
Great Britain
20613/68"

Page 1, line 10 (line marked [63]) change 821180 to 820180.

Signed and sealed this 8th day of October 1974.

(SEAL)
Attest:

McCOY M. GIBSON JR.
Attesting Officer

C. MARSHALL DANN
Commissioner of Patents